(12) United States Patent
Gabbrielli

(10) Patent No.: US 6,943,130 B2
(45) Date of Patent: Sep. 13, 2005

(54) METHOD FOR PRODUCING A FABRIC-ELASTOMER SANDWICH AND SANDWICH OBTAINED THEREBY

(75) Inventor: Giorgio Gabbrielli, Milan (IT)

(73) Assignee: Vibram S.p.A., Albizzate (IT)

( * ) Notice: Subject to any disclaimer, the term of this patent is extended or adjusted under 35 U.S.C. 154(b) by 0 days.

(21) Appl. No.: 09/865,560

(22) Filed: May 29, 2001

(65) Prior Publication Data

US 2002/0077014 A1 Jun. 20, 2002

(30) Foreign Application Priority Data

Dec. 19, 2000 (IT) ..................................... MI2000A2753

(51) Int. Cl.[7] ........................ B32B 27/12; B32B 25/10; B32B 5/08; B32B 27/00; B27N 3/10
(52) U.S. Cl. ..................... 442/286; 442/218; 442/293; 428/159; 428/160; 428/423.9; 264/257
(58) Field of Search ......................... 264/257, 324; 427/369–371; 428/159, 160, 103, 141, 423.9, 196; 442/218, 286, 293, 152, 154, 157, 164–174

(56) References Cited

U.S. PATENT DOCUMENTS

| | | | |
|---|---|---|---|
| 2,272,254 A | | 2/1942 | Hylton |
| 4,042,433 A | | 8/1977 | Hardy et al. |
| 4,269,884 A | | 5/1981 | Mackey et al. |
| 4,696,429 A | * | 9/1987 | Ortwein ........................ 238/2 |
| 5,055,340 A | * | 10/1991 | Matsumura et al. ........ 428/172 |
| 5,511,248 A | * | 4/1996 | Widdemer .................. 2/161.3 |
| 5,738,639 A | * | 4/1998 | Cueman et al. ............... 602/6 |
| 6,210,620 B1 | * | 4/2001 | Wilke ........................ 264/257 |
| 6,410,465 B1 | * | 6/2002 | Lim et al. ................... 442/389 |

OTHER PUBLICATIONS

Database WPI Section Ch, Week 199246 Derwent Publications Ltd., London, GB; AN 1992–376751 XP002235736 & JP 04 276204 A (ASICS CORP), Oct. 1, 1992 *abstract*.
Patent Abstracts of Japan vol. 014, no. 106 (C–0694), Feb. 27, 1990 & JP 01 310601 A (ASICS CORP; Others: 01), Dec. 14, 1989 *abstract*.

* cited by examiner

Primary Examiner—Terrel Morris
Assistant Examiner—Lynda Salvatore
(74) Attorney, Agent, or Firm—Guido Modiano; Daniel O'Byrne; Albert Josif

(57) ABSTRACT

A method for producing a fabric-elastomer sandwich, consisting in providing a fabric with at least minute gaps between its fibers, in placing the fabric on a mold having at least resting portions for the fabric and at least regions which are recessed with respect to the resting portions, in applying an elastomer to the side of the fabric that lies opposite to the side directed toward the mold, in applying pressure to make the elastomer flow through the minute gaps located at the recessed regions in order to fill the recessed regions with the elastomer, and in extracting the sandwich from the mold.

19 Claims, 2 Drawing Sheets

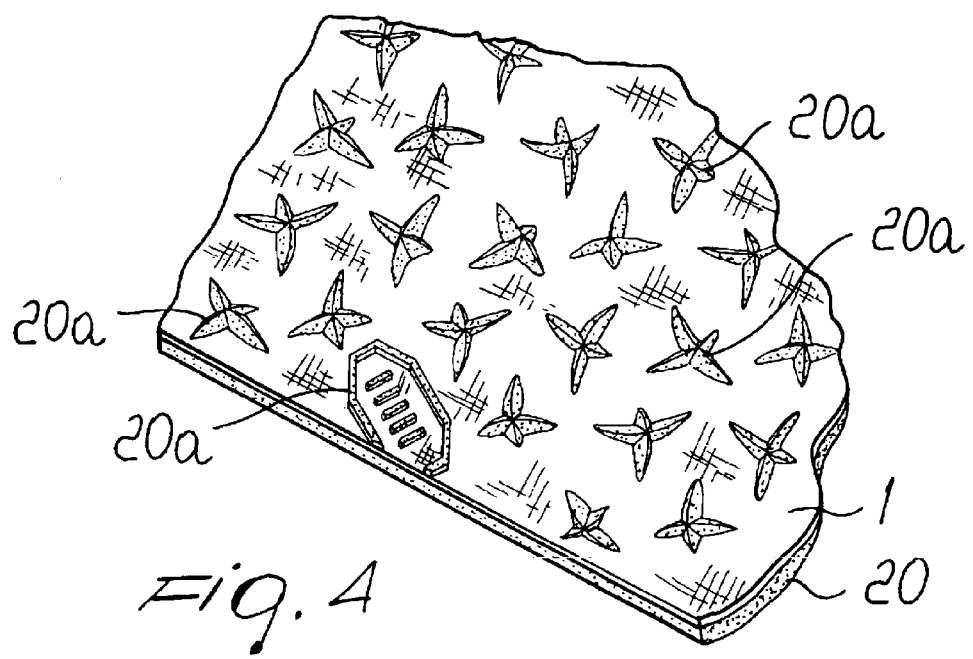
Fig. 4
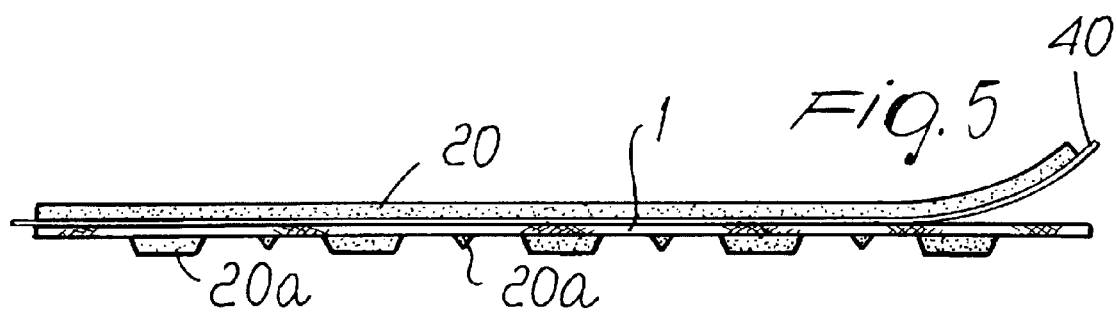
Fig. 5
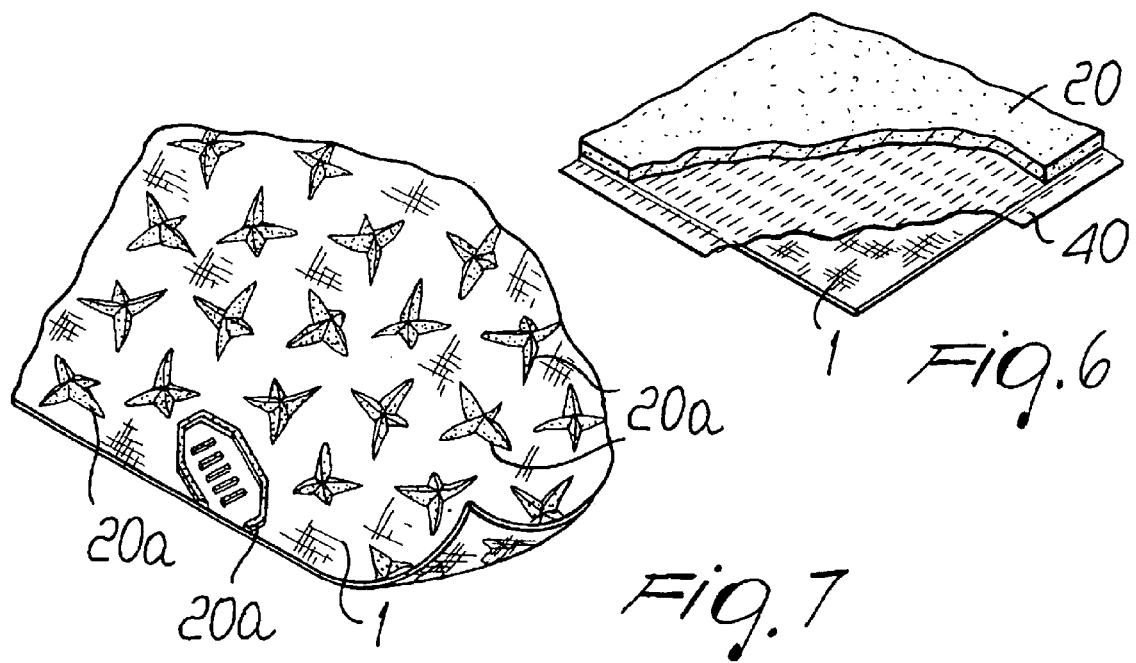
Fig. 6
Fig. 7

METHOD FOR PRODUCING A FABRIC-ELASTOMER SANDWICH AND SANDWICH OBTAINED THEREBY

BACKGROUND OF THE INVENTION

The present invention relates to a method for producing a fabric-elastomer sandwich and to the sandwich obtained thereby.

It is known that sandwiches made of a fabric and an elastomer, particularly vulcanized and non-vulcanized rubber, obtained by applying at least one elastomeric layer to a fabric, are already commercially available.

Spreading, calendering, spraying and immersion techniques are widely used to produce such sandwich in order to obtain continuous bonding between the fabric and the elastomer, which can be polyurethane, polyvinyl chloride, polyolefins, rubber latexes, acrylic or polyurethane resins, synthetic or natural rubbers, and so forth.

The above cited techniques only allow to provide continuous sandwiches, i.e., sandwiches having one side uniformly covered by a continuous layer of elastomer.

By using conventional pressure-molding methods it is possible to vary the thickness of the elastomeric region in different areas, reproducing even complicated patterns which are nonetheless continuous over the entire side of the fabric.

With microinjection distribution methods (using for example liquid polyurethanes) it is possible to obtain surfaces having separate regions, but is not possible to control exactly the thicknesses, shapes and dimensions of the individual elastomeric regions.

While continuity provides uniformity of properties, it is however a real limitation to the development of preformed anisotropic components, which are required for specific applications in several fields, such as clothing, luggage, shoes and in the technical sports field in general.

With currently available techniques, since essentially continuous layers of elastomer are obtained, it is not possible to combine the typical properties of fabric, such as lightness, flexibility, soft texture and breathability, with the typical properties of elastomeric materials, such as protection against impacts, resistance to abrasion and tearing, antislip properties, impermeableness and so forth.

SUMMARY OF THE INVENTION

The aim of the present invention is to solve the above mentioned problems, by providing a method for obtaining a fabric-elastomer sandwich in which the elastomer is organized, on at least one of the two sides of the fabric, into separate regions whose thickness, shape and dimensions are selected at will and which, besides improving the aesthetic appearance of the sandwich, allow to perform a considerable number of functions, ranging from protective action to antislip characteristics and so forth, without eliminating properties being peculiar to fabric, such as flexibility, soft texture, breathability, et cetera.

Within this aim, an object of the present invention is to provide a method which allows to obtain a sandwich in which at least one side has only some regions of elastomer which is dosed as regards position and quantity according to criteria which can be easily determined in advance, so as to have regions with elastomer alternated with regions completely free of elastomeric material.

Another object of the present invention is to provide a method which allows to obtain sandwiches which can be used in the most disparate sectors, such as shoes, clothing, luggage, in the technical sports field, and in any field requiring products having antislip properties.

Another object of the present invention is to provide a method which allows, by way of a succession of extremely quick and simple steps, to obtain a sandwich which is particularly versatile and capable of assuming the characteristics deemed appropriate for the specific applications.

This aim and these and other objects which will become better apparent hereinafter are achieved by a method for producing a fabric-elastomer sandwich, according to the present invention, characterized in that it consists in providing a fabric with at least minute gaps between its fibers, in placing such fabric on a mold having at least resting portions for the fabric and at least regions which are recessed with respect to the resting portions, in applying an elastomer to the side of the fabric that lies opposite to the side directed towards the mold, in applying pressure to make the elastomer flow through the minute gaps located at the recessed regions in order to fill such recessed regions with the elastomer, and in extracting the sandwich from the mold.

BRIEF DESCRIPTION OF THE DRAWINGS

Further characteristics and advantages of the present invention will become better apparent from the detailed description of a preferred but not exclusive embodiment of a method for producing a fabric-elastomer sandwich and of the resulting sandwich, given with the aid of the accompanying drawings, wherein:

FIG. 4 is a perspective view of the resulting sandwich;

FIG. 5 is a sectional view of a sandwich with a separable continuous elastomeric layer;

FIG. 6 is a layer-by-layer view of the separation layer for removing the elastomeric layer;

FIG. 7 is a schematic perspective view of a portion of a sandwich constituted by a fabric which has regions made of elastomeric material on a single side.

DESCRIPTION OF THE PREFERRED EMBODIMENTS

Figure 1:
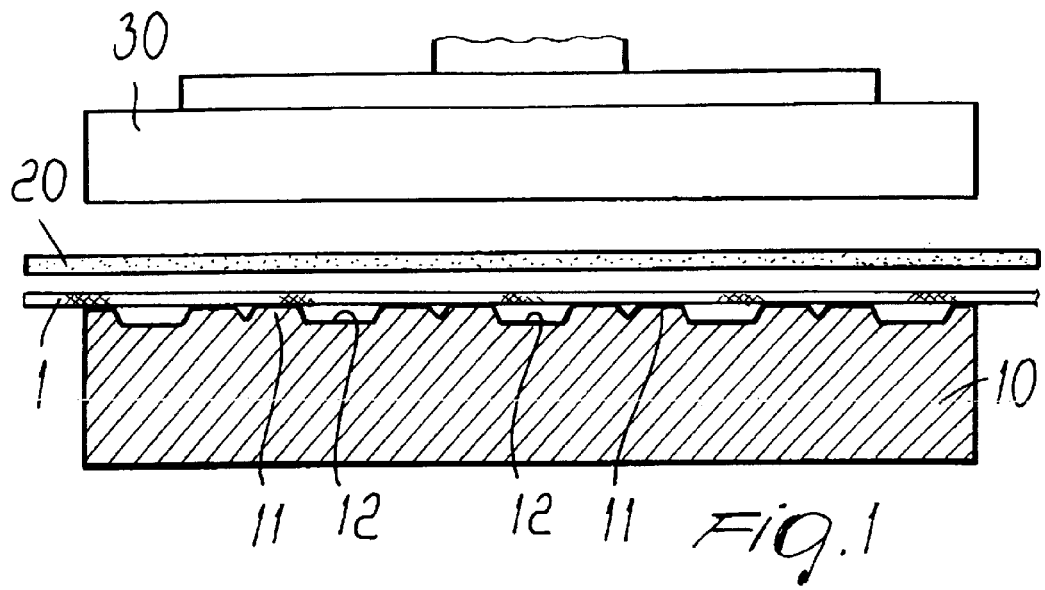
FIG. 1 is a schematic view, in the open position, of the mold for producing a sandwich having regions made of elastomeric material on one side and a continuous layer of elastomeric material on the opposite side.

With reference to the figures, the method for producing a fabric-elastomer sandwich is based on the use of a fabric 1 which has a particular weave, so that minute gaps or interspaces remain between the weft and the warp and are adapted to allow an elastomeric material to pass through them.

In order to control the passage of the elastomeric material, a mold 10 is provided which has resting portions 11 on the face directed toward the fabric 1; such resting portions are usually but not necessarily flat, and recessed regions 12 are provided between them; the recessed regions are mutually separate, they can reproduce any pattern deemed appropriate and have any depth.

In practice, the mold constitutes a surface for contact with the fabric interspersed with recessed regions of any depth and shape.

The elastomeric material is applied to the side of the fabric that lies opposite the side directed towards the mold, and by using a suitable pressure and temperature the elastomeric material flows through the fabric, passing through the interspaces or minute gaps, until it fills the recessed regions.

The peculiarity of the invention consists in that the elastomeric material passes through the fabric only in the recessed regions but is unable to flow at the regions or portions where the fabric rests.

According to a preferred embodiment, a sheet-like element which forms a layer of elastomer, designated by the reference numeral 20, and is arranged on the side of the fabric is provided for the application of the elastomeric material; a counter-mold 30 is also provided which must be shaped so as to mate perfectly with the resting portions 11 without mating with the recessed regions.

Figure 2:
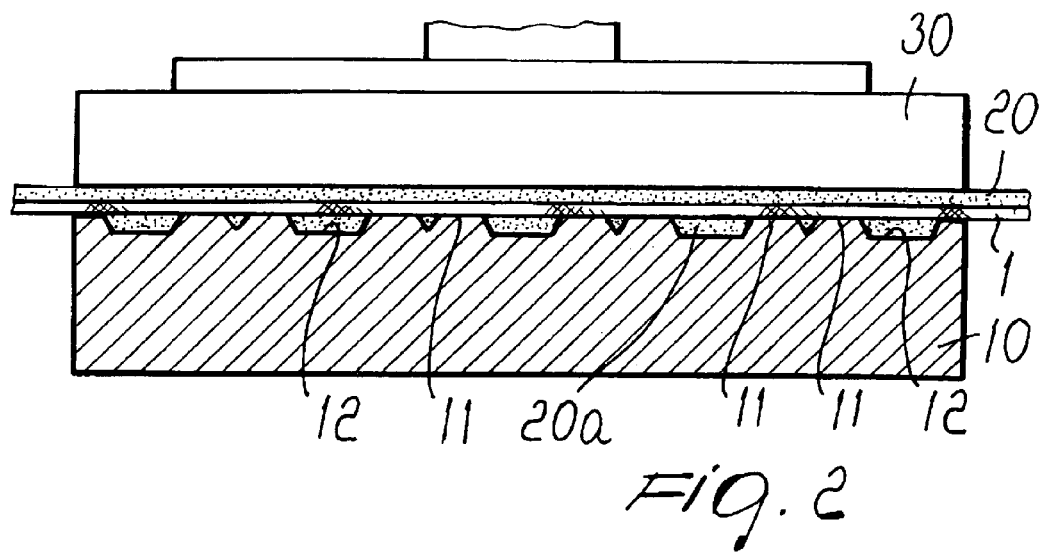
FIG. 2 is a view of the mold of FIG. 1 in the closed position.
Figure 3:
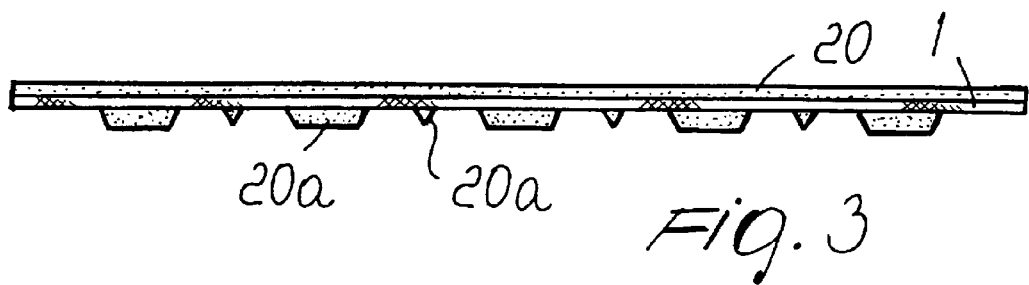
FIG. 3 is a sectional view of the resulting sandwich.

As shown in FIGS. 1 to 4, once the mold has been closed, pressures and temperatures capable of liquefying the elastomer are applied; the elastomer is made to flow through the fabric 1 in order to obtain a sandwich which has, on one side, a continuous layer of elastomeric material which corresponds in practice to the layer 20 and, on the other side, regions of elastomer which are located at the recessed regions 12, with the possibility to reproduce any fineness of pattern, providing a plurality of mutually separate regions arranged in any manner or configuration.

If one wishes to obtain a sandwich simply constituted by a layer of fabric 1 provided with the regions of elastomeric material, designated by the reference numeral 20a, only on one side, a separation layer 40 is interposed between the elastomeric material in layer form 20 and the fabric 1.

The separation layer is typically provided by a film which is capable of withstanding the process conditions, i.e., a film which is not destroyed, melted or completely modified at the temperatures that are used, but instead breaks selectively, due to the pressures involved, at the recessed regions of the mold in order to allow the elastomer to flow through the fabric.

The most commonly usable films are constituted by films of non-oriented nylon 6, nylon 6.6 and PET, with a thickness between 10 and 40 microns, and in mono- or biaxially oriented form, with a thickness between 5 and 25 microns.

Once the elastomeric material has been molded, as shown schematically in FIG. 5, it is possible to separate the continuous layer of elastomeric material, thus obtaining a fabric which has the elastomer regions 20a only on one side.

In the practical applications, it is possible to obtain sandwiches which have a continuous layer on one side and separate regions of elastomer on the other side, or it is possible to provide a sandwich constituted by a fabric which has a completely free side and elastomer regions on the other side; it is further possible to provide elastomer regions on both sides of the fabric, in which case the counter-mold must have recessed regions which correspond to the elastomer regions on the other side.

Various kinds of fabric that have the particular characteristic of having, between the fibers or anyhow between the weft and warp, minute gaps or interspaces which allow the elastomer to pass when pressure is applied, can be used to perform the process.

The materials used can be synthetic, such as nylon and polyester, optionally reinforced with aramid fibers, or natural materials, such as cotton and linen.

Dyes and finishes may be resistant or not to the conditions for bonding with the elastomer, depending on whether one wishes to maintain the original appearance of the fabric or is interested in particular color change effects.

The elastomer is typically used in the form of a film or calendered sheet of preferably but not necessarily constant gauged thickness, in an amount sufficient to fill the pattern of the mold. The greater the thickness of the pattern to be reproduced, the thicker the calendered sheet that must be used in order to ensure filling.

It should also be specified that instead of using the elastomer in the form of a calendered layer it is possible to use, for example, a deposition of material directly in the molding press or to perform injection with an injection press in a cold mold, without departing from the concept of the solution idea consisting in providing the flow of the elastomer through the fabric, so as to produce mutually separate elastomer regions, on at least one side thereof.

The choice of the type of elastomer, once the type of sandwich to be produced has been determined, depends on the final properties that the pattern requires and on the type of fabric used.

The Theological properties of the elastomer used are very important for controlling the passage of the elastomer through the fabric if the weave of the fabric, the machine used and the selected process conditions remain the same. Such Theological properties in fact determine the tendency of the elastomer to pass or not in the various points of the fabric and therefore ultimately determine the control and the final result on the fabric. The more one wishes complete blocking of the elastomer in the contact regions, the more one must consider elastomers or formulations characterized by high viscosity in the process conditions, and vice versa.

By way of example, it is possible to use, as elastomers, mixtures based on materials such as rubber, IR, BR, SBR, NBR, NR, EPDM, EVA and the like, and silicone rubbers or optionally TPU, TR, PVC and the like.

Still by way of example, it is noted that numerous recessed regions 12, which are e.g. star-shaped and are interspersed with other regions shaped like stylized octagons, were cutout as recesses in a plate-like mold in which the bottom is constituted by a flat contact surface.

The counter-mold 30 is formed by a flat plate which has no recessed regions and is adapted to provide a perfect seal in the points of the mold bottom that have no pattern.

Finish-free Cordura 1000, Cordura 500, Cordura 300 and Cordura 170 fabric, available on the market, were used.

Blends of rubber based on SBR and polybutadiene materials, allowing sulfur vulcanization and appropriately accelerated, were used as elastomeric element.

The rubbers were calendered so as to obtain a layer of approximately 2 mm.

A compression press with ground plates measuring 1000× 750 mm and a closure pressure of approximately 600 tons was used to bond the rubbers to the fabrics.

The molding temperature conditions used ranged from 160° C. for 12–15 minutes to 175–180° C. for 6–8 minutes, depending on the mixtures and weaves used.

Ordinary releasing agents for rubber were provided on the mold and on the counter-mold.

In order to obtain the sandwich of FIG. 4, the fabric was placed so as to cover the pattern of the mold and a layer of calendered material of the same size was superimposed; then pressure molding was performed according to the above described cycles, and after completing the vulcanization cycle the intended fabric-rubber sandwich was removed from the mold.

In order to obtain a sandwich of the type shown in FIG. 7, a film of non-oriented nylon 6 with a thickness of 25 microns was interposed between the fabric and the elastomeric layer. After performing the vulcanization cycle, the sandwich was removed and the rubber base was separated from the fabric by a slight pressure. The interposition of the film 40 between the fabric and the calendered material prevented the adhesion of the elastomeric material to the contiguous side of the fabric, thus allowing to obtain a fabric having a pattern with separate regions which are provided and bonded only on one side of the fabric.

In this manner, the fabric remains breathable in all the regions that are not covered by the regions of elastomeric material.

A breathable impermeable polyurethane osmotic membrane was then bonded which allows to obtain a breathable impermeable fabric which has a texture and a flexibility which can be compared to that of the original fabric but has distinctly superior resistance to abrasion and grip.

The same method allowed to produce a sole for a shoe.

In this case, a series of recesses which in practice reproduce the outer side of the sole was provided in the mold, and a continuous layer of elastomeric material was left on the other side, which constitutes the inner side in contact with the upper, forming in practice the load-bearing layer of the sole.

Fabrics such as Cordura 1000 and blends of the kind typically used for shoes, i.e., blends based on SBR and natural rubber, were used.

The sole was produced by way of pressure molding techniques, using molds designed as described above.

The vulcanization cycle applied lasted 7 minutes at temperatures of about 175° C., with pressures of 400 tons.

From the above description it is thus evident that the invention achieves the intended aim and objects and in particular that the provision of a method which allows to achieve the passage of the elastomeric material through the fabric in preset regions allows to provide, on one side of the sandwich, a freely selectable arrangement of regions of elastomeric material which are firmly bonded to the fabric and can give such fabric any selected technical properties.

The invention thus conceived is susceptible of numerous modifications and variations, all of which are within the scope of the appended claims.

All the details may furthermore be replaced with other technically equivalent elements.

In practice, the materials used, as well as the contingent shapes and dimensions, may be any according to requirements.

The disclosures in Italian Patent Application No. MI2000A002753 from which this application claims priority are incorporated herein by reference.

What is claimed is:

1. A fabric-elastomer sandwich, comprising; a fabric woven so as to contain minute gaps that allow passage of elastomeric material therethrough, said fabric having, on at least one side thereof, separate regions which are in relief with respect to the fabric surface, and are formed by an elastomer subjected to pressure and heating such as to make it flow through said minute gaps of the fabric, said separate relief, elastomer regions alternating on said at least one fabric side with fabric regions that are completely free of elastomer; and an osmotic membrane which is bonded at least at the regions of fabric that are completely free of elastomer so as to provide breathable/impermeable properties to the fabric.

2. The sandwich of claim 1, comprising said separate elastomer regions on one side thereof and a continuous layer of elastomer on the opposite side.

3. The fabric-elastomer sandwich of claim 1, comprising a layer of fabric which has, on both sides thereof, separate regions made of the elastomer flowed through said fabric, said separate regions being in relief with respect to said fabric surface.

4. The fabric-elastomer sandwich of claim 1, wherein the elastomer is constituted by mixtures based on materials selected from a group comprising polyurethane, polyvinyl chloride, polyolefin, natural and synthetic rubber and acrylic, polyurethane and silicone resins.

5. The fabric-elastomer sandwich of claim 1, wherein the separate elastomer regions have thickness and areas selected according to requirements.

6. The fabric-elastomer sandwich of claim 1, wherein the separate elastomer regions have a thickness of 2 mm.

7. The fabric-elastomer sandwich of claim 1, wherein the fabric is made of materials selected from a group comprising nylon, polyester, natural fibers and mixed natural and synthetic fibers.

8. The fabric-elastomer sandwich of claim 7, wherein the fibers that make up the fabric are selected from a group comprising cotton, linen and aramid fibers.

9. The fabric-elastomer sandwich of claim 1, wherein said separate elastomer regions have a discontinuous configuration that provides high elasticity and is suitable to preserve a flexibility thereof that is similar to that of the fabric alone.

10. A fabric-elastomer sandwich, comprising a woven fabric that contains minute gaps which allow passage of elastomeric material therethrough, said fabric having, on a first side thereof, separate regions which are in relief with respect to the fabric surface and are formed by an elastomer flown through said minute gaps, by way of pressure and heating application, from a second, apposite side of the fabric, said separate relief, elastomer regions being provided in a preset configuration in which said elastomer regions alternate on said first side with fabric regions that are completely free of elastomer, and wherein said second, opposite side of the fabric is completely free of elastomer.

11. The fabric-elastomer sandwich of claim 10, further comprising an osmotic membrane which is bonded thereto at least at the fabric regions that are completely free of elastomer so as to provide breathable/impermeable properties to the fabric.

12. A fabric-elastomer sandwich, comprising: a woven fabric layer that contains minute gaps which allow passage of elastomeric material therethrough; a plurality of separate elastomer regions provided in relief with respect to the fabric surface on one first side thereof and formed by elastomer flown through said minute gaps by way of pressure and heating application from a second, opposite side of the fabric; a plurality of fabric surface regions that are completely free of elastomer, said separate relief, elastomer regions being arranged in a preset configuration in which the elastomer regions alternate with said fabric surface regions that are completely free of elastomer; a continuous layer of elastomer material arranged on said second fabric side; and a separation layer interposed between said continuous layer of elastomer and said second fabric side, and wherein said separation layer is adapted to break selectively and allow elastomer flowing that forms said separate elastomer regions upon pressure and heating application from said continuous elastomer layer, through said minute gaps, to said first fabric side, said separation layer being further adapted for separation from the fabric along with said continuous elastomer layer.

13. The fabric-elastomer sandwich of claim 12, wherein said elastomer is constituted by blends based on materials selected from a group including rubber, IR, BR, SBR, NBR, NR, EPDM, EVA.

14. The fabric-elastomer sandwich of claim 12, wherein said elastomer is constituted by silicone rubbers.

15. The fabric-elastomer sandwich of claim 12, wherein said elastomer is a material of a thermoplastic type, selected from a group comprising TPU, TR, PVC.

16. The fabric-elastomer sandwich of claim 12, wherein said separation layer is provided by a film that is indestructible, non-meltable or modifyable at heating temperatures that are applied to said elastomer.

17. The fabric-elastomer sandwich of claim 16, wherein said separation layer is constituted by a non-oriented plastic film with a thickness of 10 to 40 microns.

18. The fabric-elastomer sandwich of claim 16, wherein said separation layer is constituted by any of a mono- and biaxially oriented plastic film with a thickness between 5 and 25 microns.

19. A fabric-elastomer sandwich, comprising a fabric woven so as to contain minute gaps that allow passage of elastomeric material therethrough, said fabric having, on both sides thereof, separate regions which are in relief with respect to the fabric surface, and are formed by an elastomer subjected to pressure and heating such as to make it flow through said minute gaps of the fabric, said separate relief, elastomer regions alternating with fabric regions that are completely free of elastomer.

* * * * *